US006770684B2

(12) United States Patent
Lutter et al.

(10) Patent No.: US 6,770,684 B2
(45) Date of Patent: Aug. 3, 2004

(54) PRODUCTION OF FLEXIBLE POLYURETHANE FOAMS

(75) Inventors: Heinz-Dieter Lutter, Diepholz (DE); Bernd Bruchmann, Freinsheim (DE); Klaus Wagner, Wagnefeld (DE); Jens Müller, Osnarbrück (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 158 days.

(21) Appl. No.: 10/095,734

(22) Filed: Mar. 12, 2002

(65) Prior Publication Data

US 2003/0032689 A1 Feb. 13, 2003

(30) Foreign Application Priority Data

Mar. 13, 2001 (DE) .......................... 101 11 823

(51) Int. Cl.[7] .............................. C08G 18/28
(52) U.S. Cl. ................. 521/174; 252/182.27; 568/619; 568/620; 568/624
(58) Field of Search .................... 252/182.27; 521/174; 568/619, 620, 624

(56) References Cited

U.S. PATENT DOCUMENTS

| 3,336,242 A | | 8/1967 | Hampson et al. | |
| 5,420,170 A | | 5/1995 | Lutter et al. | |
| 5,476,969 A | * | 12/1995 | Hinz et al. | 564/505 |
| 5,648,559 A | * | 7/1997 | Hager | 568/620 |
| 6,060,531 A | * | 5/2000 | Horn et al. | 521/167 |

FOREIGN PATENT DOCUMENTS

| DE | C 1520727 | 8/1942 |
| DE | A 2425657 | 12/1974 |
| EP | A 047 371 | 3/1982 |
| EP | A 433 878 | 6/1991 |
| GB | 1064576 | 4/1967 |
| GB | 1079105 | 8/1967 |
| GB | 1120223 | 7/1968 |
| GB | 1422056 | 1/1976 |
| GB | 1480972 | 7/1977 |

OTHER PUBLICATIONS

EPO Search Report Dated Apr. 23, 2003.
Abstract of EP 047 371.

* cited by examiner

*Primary Examiner*—John M. Cooney, Jr.
(74) *Attorney, Agent, or Firm*—Fernando A. Borrego

(57) ABSTRACT

The present invention relates to a process for the production of flexible polyurethane foams by reaction of
a) at least one compound having at least two isocyanate-reactive hydrogen atoms, with
b) polyisocyanates,
wherein the compund used as said compound having at least two isocyanate-reactive hydrogen atoms a) comprises at least one block polyoxypropylene/polyoxyethylene/polyol having a hydroxyl value of from 25 to 45 mg KOH/g and a content of terminally bound ethylene oxide units of from 15 to 17 wt %, based on the total amount of the alkylene oxide, obtained by attachment of ethylene oxide and propylene oxide to an initiator having an average functionality of 3.

13 Claims, No Drawings

PRODUCTION OF FLEXIBLE POLYURETHANE FOAMS

DESCRIPTION

The present invention relates to a process for the production of flexible polyurethane foams, particularly highly resilient flexible foams and flexible foams having a high load-bearing capacity, using a specific polyether alcohol.

The synthesis of polyurethane—also referred to below as PU for short—flexible foams by reaction of polymolecular polyhydroxyl compounds and, optionally, chain-extenders with organic polyurethanes is known and is described in numerous patent specifications and other publications.

An example thereof is Kunststoffhandbuch, Vol. VII, "Polyurethane", Carl Hanser Verlag, Munich, 1st Edition, 1966, edited by Dr. R. Vieweg and Dr. A. Hoechtlen, and 2nd Edition, 1983, and 3rd Edition 1993, edited by Dr. G. Oertel.

In order to produce the flexible PU foams, polyester polyols and/or polyoxyalkylene polyols based on 1,2-propylene oxide, ethylene oxide or mixtures thereof and also mixtures of such polyoxyalkylene polyols and graft polyoxyalkylene polyols are usually employed as polymolecular polyhydroxyl compounds, and alkanediols, oxyalkylene glycols or low-molecular compounds containing hydroxyl and/or amino groups and having a functionality of from 2 to 4, such as glycerol, trimethylol propane, or alkanolamines are used as chain-extenders. The organic polyurethanes used are mostly commercial toluylene-diisocyanates (TDI), diphenylmethane diisocyanate isomers (MDI), mixtures of diphenylmethane diisocyanates and polyphenylpolymethylene polyisocyanates (crude MDI), and mixtures of crude MDI and TDI.

According to DE-C 1,520,737 (U.S. Pat. No. 3,336,242) flexible polyurethane foams having an open cellular structure can be produced by a single-stage process by causing polyurethanes to react with polyoxypropylene-polyoxyethylene triols having molecular weights of from 3000 to 8000 and containing, as end block, from 3 to 5 wt % of bound ethylene oxide and, as initiator, bound glycerol.

Very soft flexible polyurethane foams are obtained, according to GB-A 1,079,105, from a polyether alcohol or a mixture of polyether alcohols having a hydroxyl value of from 70 to 170 and containing trifunctional polyoxyalkylene polyol, such as propoxylated glycerol and up to 40 wt % of a polyoxyalkylene glycol, eg, propoxylated ethylene glycol, and an organic polyurethane, preferably TDI, in the presence of water and a fluorochlorinated hydrocarbon, preferably trichlorofluoromethane, as expanding agent. Flexible PU foams are also described in GB-A 1,064,576. According to this patent specification, organic diisocyanates, preferably TDI, are caused to react with a mixture of from 50 to 90 wt % of a polyoxyalkylene triol having a hydroxyl value of from 30 to 170 and from 10 to 50 wt % of a polyoxyalkylene diol having a hydroxyl value of from 40 to 110, which mixture has a content of primary hydroxyl groups of from 10 to 65%, in the presence of water.

According to GB-A 1,480,972, flexible polyurethane foams having improved resilience properties are produced in the absence of silicone foam stabilizers by causing organic polyurethanes to react with a mixture of polyetherols comprising at least one polyether polyol having a functionality of from 2 to 4, an equivalent weight of between 1000 and 3000, and, optionally, an ethylene oxide content of up to 30 wt %, and from 0.5 to 20 wt %, based on polyether polyol, of at least one polyoxypropylene-polyoxyethylene alcohol having a functionality of from 1 to 4, an equivalent weight of from 500 to 5000, and an ethylene oxide content of from 30 to 95 wt %, in the presence of catalysts and expanding agents.

DE-A 2,425,657 discloses a process for the production of flexible cellular polyurethanes, in which, in addition to an expanding agent and a polyoxyalkylene polyol, a diphenylmethane-diisocyanate composition is used as a component essential to the invention, which composition has an average isocyanate functionality of less than 2.4 and contains not more than 60 wt % of 4,4'-MDI and at least 15 wt % of 2,4'-MDI. The preferred polyoxyalkylene polyols used are polyoxypropylene-polyoxyethylene polyols with random or block binding of the oxyalkylene groups, for the production of which initiators comprising, in particular, mixtures of one diol and one triol, eg, diethylene glycol/glycerol mixtures, are used. The products described possess good mechanical properties, particularly high compressive strength and a good sag factor. The sag factor is the compressive strength at 65% indentation divided by the compressive strength at 25% indentation. The higher the sag factor, the more resilient the foam. Higher resilience imparts a more comfortable feeling.

An essential factor regarding the preparation of flexible polyurethane foams and the properties of the resulting foamed plastics is the reactivity of the polyether alcohols used, which must be selected with great care.

If the reactivity of a polyether alcohol used for the production of flexible polyurethane foams is too high, the polyether alcohols are too active. As a result of this overactivation, molded foams may, for example, become deformed immediately after leaving the mold. An adequate content of open cells is necessary in the foam matrix in order to prevent subsequent shrinking of the shaped article. This phenomenon is directly governed by the reactivity of the polyether polyols. If the cells open too late and/or not enough due to the high reactivity of the polyalcohol, the shaped article (on release from the mold) or the block (during the production of block foams) does not stay dimensionally stable because $CO_2$ located in the cell can diffuse out of the cell, which therefore shrinks, whilst the atmospheric air cannot diffuse into the cell to the same extent. If the number of open cells is too high, the foam collapses.

Unduly low activity, on the other hand, reduces the release time, which in turn lowers the speed of production of shaped foams, so that the foamed plastics can no longer be produced within a specified minimum cycle period. In the production of block foams there occurs, in this case, the sink-back phenomenon, ie the formation of a concavity in the block, or so-called cold flow, which means the formation of a trapeziform block cross-section, which increases the cutting involved during further processing of the foamed plastics and consequently leads to product losses.

It is known that raising the reactivity of a block polyoxypropylene/polyoxyethylene/polyol will increase the reaction rate in the production of polyurethanes. The reactivity is usually determined by the amount of ethylene oxide added to the chain end during synthesis of the polyether polyol. When the amount of ethylene oxide added to the chain end is raised, the proportion of more reactive primary hydroxyl groups usually rises and thus the reactivity of the polyether alcohols increases.

This experience should lead one to expect that a linearly increasing content of ethylene oxide in the block polyoxypropylene/polyoxyethylene/polyols would make it possible to set the reactivity to a desirably high value. It has been found, however, that this is not the case.

Particularly in the case of high-load-bearing flexible foams, also known as HLB foams, and highly resilient foams, also known as HR foams, optimal reactivity of the polyalcohols is necessary in order to obtain good-quality products not suffering from the above drawbacks.

It is the object of the present invention to provide flexible polyurethane foams, for the production of which a polyether alcohol of optimal reactivity is used as polyalcohol component and the above drawbacks of the prior art are avoided.

We have now found that, surprisingly, polyether alcohols containing from 15 to 17 wt % of terminally bound ethylene oxide units, based on the total amount of the alkylene oxide, and having a hydroxyl value ranging from 20 to 60 mg KOH/g exhibit optimal reactivity, particularly in the case of HLB foams and HR foams, when used for manufacturing both block and molded flexible foams.

Accordingly, the invention relates to a process for the production of flexible polyurethane foams by reaction of
a) at least one compound containing at least two isocyanate-reactive hydrogen atoms, with
b) polyisocyanates,
wherein the compound containing at least two isocyanate-reactive hydrogen atoms a) is at least one block polyoxypropylene/polyoxyethylene/polyol having a hydroxyl value of from 25 to 45 mg KOH/g, and preferably from 25 to 35 mg KOH/g and having a content of terminally bound ethylene oxide units of from 15 to 17 wt %, based on the total amount of the alkylene oxide, obtained by the addition of ethylene oxide and propylene oxide to an initiator having an average functionality of 3.

The invention also relates to flexible polyurethane foams, obtained by causing
a) at least one compound having at least two isocyanate-reactive hydrogen atoms and containing at least one block polyoxypropylene/polyoxyethylene/polyol having a hydroxyl value of from 25 to 45 mg KOH/g, and preferably from 25 to 35 mg KOH/g and containing from 15 to 17 wt % of terminally bound ethylene oxide units, based on the total amount of the alkylene oxide, obtained by the addition of ethylene oxide and propylene oxide to an initiator having an average functionality of 3, to react with
b) polyisocyanates.

The invention also relates to block polyoxypropylene/polyoxyethylene/polyols having a hydroxyl value of from 25 to 45 mg KOH/g, and preferably from 25 to 35 mg KOH/g and a content of terminally bound ethylene oxide units of from 15 to 17 wt %, based on the total amount of the alkylene oxide, obtained by the addition of ethylene oxide and propylene oxide to an initiator having an average functionality of 3.

The invention also relates to polyol mixtures for the production of flexible polyurethane foams containing at least one block polyoxypropylene/polyoxyethylene/polyol, with from 15 to 17 wt % of ethylene oxide, based on the total amount of the added alkylene oxide, attached to the end of the polyether chain, and having a hydroxyl value ranging from 25 to 45 mg KOH/g and preferably from 25 to 35 mg KOH/g.

Preference is given to mixtures of the block polyoxypropylene/polyoxyethylene/polyols used in the process of the invention with at least one graft polyalcohol. By graft polyalcohols we mean polyether alcohols in which olefinically unsaturated monomers have been polymerized in situ. Preferred olefinically unsaturated monomers are styrene and acrylonitrile. Preference is given to graft polyalcohols having a hydroxyl value ranging from 20 to 40 mg KOH/g and a solids content ranging from 30 to 50 wt %. The proportion of graft polyalcohols in the mixture is preferably between 5 and 95 mg KOH/g, particularly between 27 and 75 wt %, based on component a.

When producing highly resilient foamed plastics, also known as HR foams, use is preferably made of graft polyalcohols showing high reactivity, ie having a high content of primary OH groups at the chain end.

When producing flexible polyurethane foams having a high load-bearing capacity, also known as HLB foams, use is preferably made of graft polyalcohols showing low reactivity, that is to say, polyalcohols whose chain end preferably comprises secondary, ie, less reactive OH end groups.

The block polyoxypropylene/polyoxyethylene/polyols used in the process of the invention can be produced by well-known methods. The preparation thereof is usually carried out by catalytic addition of alkylene oxides to compounds having active hydrogen atoms, so-called initiators. The catalysts used can, for example, be basic compounds, preferably alkali hydroxides, such as potassium hydroxide, or multimetal cyanide compounds, also known as DMC catalysts. The synthesis of polyether alcohols is described, for example, in Kunststoffhandbuch, Vol. 7 "Polyurethane", Carl Hanser Verlag Munich Vienna, 3rd Edition 1993, chapter 3.1.1.

Trifunctional compounds, particularly triols, are used as initiators for the production of the block polyoxypropylene/polyoxyethylene/polyols used in the process of the invention. Preferably, the initiators are selected from the group comprising glycerol, trimethylol propane, and mixtures of these compounds.

The polyether alcohols used in the process of the invention contain, as stated above, a terminal ethylene oxide block in a concentration of from 15 to 17 wt %, based on the total amount of alkylene oxide used. On the other hand, the polyether alcohols can possess further ethylene oxide units, which are added by polymerization in the form of pure ethylene oxide blocks or as mixed ethylene oxide/propylene oxide blocks. The amount of additional ethylene oxide should not be more than 10 and preferably not more than 5 wt %, based on the total amount of alkylene oxide used.

Preferably however, the block polyoxypropylene/polyoxyethylene/polyols used in the process of the invention contain, apart from the ethylene oxide end block, only propylene oxide units in the polyether chain.

The flexible polyurethane foams produced by the process of the invention can, as stated above, be both block foams and molded foams.

In order to produce the foamed plastics, the polyurethanes b) are foamed together with the compounds having at least two isocyanate-reactive hydrogen atoms a) in the presence of expanding agents, catalysts, and, optionally, auxiliaries and/or additives, as blocks or in open or closed molds. In the continuous block foaming process, the constituents of the formulation are usually fed continuously to the mixing head in specified proportions in separate metered streams. The reaction mixture is discharged onto a conveyor belt usually showing an inclination of from 3 to 5 degrees over an initial section, on which conveyor belt paper folded to a U-shaped cross section has been placed. At a distance of ca 6 m from the point of discharge, the foam achieves its maximum height of expansion and begins to blow off expanding agent. This is when the cells burst. The continuous foam is cut up into blocks of from 2 to 40 m in length and left to cool. In the batch block foaming process, the procedure is similar to that described above, except that the constituents are intermixed in a feed tank having a capacity of from ca 60 to 80 liters over a period of approximately 10 seconds before being discharged into a rigid mold. The polyaddition product rises and cools down, after which the foam is removed from the mold and passed on for further processing, involving usually horizontal and vertical cutting.

In the mold-foaming process, the reaction mixture is placed in a mold, which is then sealed. Following the reaction, the foam is removed from the mold.

Special advantages arise from the use of the block polyoxypropylene/polyoxyethylene/polyols used in the process of the invention when carrying out the difficult production of HR block foams in a low density range, ie at densities of <25 kg/m$^3$, and in a high density range, ie at densities of >60 kg/M$^3$. These foams are preferably used in the mattress and furniture industries. These highly resilient block foams are usually produced using at least one reactive graft polyalcohol and at least one reactive polyalcohol. Compatibility between the graft polyalcohol on the one hand and the reactive polyalcohol on the other hand is a very significant factor governing the stability of the block foams especially in said extremely low or high density ranges. Mixtures of the block polyoxypropylene/polyoxyethylene/polyols used in the process of the invention with less reactive graft polyoxyalkylene polyols show optimal behavior during expansion in the production of HR foams.

We have also found that, surprisingly, the block polyoxypropylene/polyoxyethylene/polyols used in the process of the invention can achieve an improved emulsifying power of component a) with the polar ingredient water, by which means finer emulsion structures and thus smaller particles can form, these being a particularly significant factor governing the stability of the foam and, in addition, the stability of the manufacturing process.

The following detailed remarks relate to the materials used for the preparation of the flexible polyurethane foams of the invention:

Polyisocyanates a) used for the production of the flexible polyurethane foams of the invention are suitably any organic polyisocanates known per se. Examples thereof are aliphatic, cycloaliphatic, arylaliphatic, and aromatic polyfunctional isocyanates. As specific examples there may be mentioned: aliphatic diisocyanates, such as ethylene, 1,4-tetramethylene, 1,6-hexamethylene, and 1,12-dodecane diisocyanates; cycloaliphatic diisocyanates such as [1,3 and 1,4]-cyclohexane diisocyanates and arbitrary mixtures of these isomers, 1-isocyanato-3,3,5-trimethyl-5-isocyanatomethylcyclohexane, [2,4 and 2,6]-hexahydrotoluylene diisocyanates, and arbitrary mixtures of these isomers, [4,4' and 2,4']-diisocyanatodicyclohexylmethanes; aromatic diisocyanates, such as [1,3 and 1,4]-phenyl diisocyanates, [2,4 and 2,6]-toluylene diisocyanates and arbitrary mixtures of these isomers, [2,2', 2,4' and 4,4']-diphenylmethane diisocyanates and 1,5-naphthalene diisocyanate; aromatic polyurethanes 4,4',4"triphenylmethane triisocyanate, 2,4,6-triisocyanatobenzene and polyphenylpolymethylene polyisocyanates. Use may also be made of modified polyisocyanates, for example, carbodiimide group-containing polyisocyanates, allophanate group-containing polyisocyanates, isocyanurate group-containing polyisocyanates, urethane group-containing polyisocyanates, and ester group-containing polyisocyanates. Such compounds are well known.

Preference is given to the commercially available, optionally urethane group-containing, aromatic di- and polyisocyanates, such as [2,4 and 2,6]-toluylene diisocyanates and arbitrary mixtures of these isomers, [2,2', 2,4' and 4,4']-diphenylmethane diisocyanates and arbitrary mixtures of these isomers, mixtures of [2,2' 2,4', and 4,4']-diphenylmethane diisocyanates and polyphenylpolymethylene polyisocyanates (crude MDI) and mixtures of toluylenediisocyanates and crude MDI. The said di- and polyisocyanates can be used individually or intermixed.

The block polyoxypropylene/polyoxyethylene/polyols used in the process of the invention are also very well suited for the production of flexible polyurethane foams using aliphatic isocyanates. Since the aliphatic isocyanates which are less reactive with compounds having at least two isocyanate-reactive hydrogen atoms undergo polyaddition only together with high concentrations of gel catalysts, ie catalysts which preferentially catalyze urethane formation, precise selection of the reactivity of the polyalcohols used is particularly important here.

The block polyoxypropylene/polyoxyethylene/polyols used in the process of the invention can be caused to react with the polyisocyanates alone or in combination with other polyalcohols.

The other polyalcohols used, individually or intermixed, are preferably conventional linear and/or branched polyesterols and more preferably polyetherols having molecular weights of from 200 to 8000, preferably greater than from 600 to 5000, and more preferably from 1800 to 3500. Also suitable, however, are other hydroxyl group-containing polymers having the aforementioned molecular weights, for example, polyester amides and poly(oxymethylene)s.

Preferably the block polyoxypropylene/polyoxyethylene/polyols used in the process of the invention are used in admixture with polyether alcohols, particularly those having a functionality ranging from 2 to 8, preferably from 2 to 4, and more preferably from 2 to 3, and having said molecular weights. Particular preference is given to the use of the block polyoxypropylene/polyoxyethylene/polyols used in the process of the invention in admixture with graft polyalcohols, as stated above.

For certain fields of application, it may be advantageous to use, in the production of the flexible polyurethane foams, in addition to said polyhydroxyl compounds, chain-extenders and/or cross-linking agents. Such agents are suitably polyfunctional, particularly di- and tri-functional, compounds having molecular weights of from 17 to 600, and preferably from 60 to 300. Use is made of the following, for example: di- and tri-alkanolamines, such as diethanolamine and triethanolamine, aliphatic and aromatic diamines such as 1,2-diaminoethane, butylenediamine, 1,4-butylenediamine, 1,6-hexamethylenediamine, 4,4'-diaminodiphenylmethane, 3,3'-dialkyl-substituted 4,4'-diaminodiphenylmethane, [2,4 and 2,6]-toluylenediamines and, preferably, aliphatic diols and triols containing from 2 to 6 carbons, such as ethylene glycol, propylene glycol, 1,4'-butylene glycol, 1,6-hexamethylene glycol, glycerol, and trimethylol propane.

If chain extenders or cross-linking agents are used, these are employed in concentrations of from 1 to 60 parts by weight, and preferably from 10 to 30 parts by weight, per 100 parts by weight of polyhydroxyl compounds.

The expanding agents which are used in the process of the invention preferably include water, which reacts with isocyanate groups to form carbon dioxide. The amounts of water advantageously used, are, governed by the desired density of the foamed plastics, from 0.1 to 8 parts by weight, and preferably from 1.5 to 5 parts by weight, based on 100 parts by weight of polyhydroxyl compound.

So-called physically active expanding agents may alternatively be used together with, or instead of, water. These are liquids which are inert to the ingredients and have boiling points below 100° C., preferably below 50° C., particularly between −50° C. and 30° C., under ambient pressure, so that they vaporize under the influence of the exothermic polyaddition reaction. Examples of such liquids which are preferably use are hydrocarbons, such as pentane, n-butane, isobutane, and propane, ethers, such as dimethyl ether and diethyl ether, ketones, such as acetone and methyl ethyl ketone, ethyl acetate, and preferably halogenated hydrocarbons, such as dichloromethane, trichlorofluoromethane, dichlorodifluoromethane, dichloromonofluoromethane, dichlorotetrafluoroethane, and 1,1,2-trichloro-1,2,2-trifluoroethane. In addition, mixtures of these low-boiling liquids with each other and/or with other substituted or unsubstituted hydrocarbons may be used.

The amount of physically active expanding agent necessary, besides water, can be determined in a simple manner and is, depending on the desired foam density, approximately from 0 to 50 parts by weight, and preferably from 0 to 20 parts by weight, per 100 parts by weight of polyhydroxyl compound. It may be advantageous to mix the polyalcohol component of the invention with the physically active expanding agent and thus reduce the viscosity.

In order to accelerate the reaction between the polyhydroxyl compounds, water and, optionally, chain extenders or cross-linking agents and the polyisocyanates, conventional polyurethane catalysts are incorporated in the reaction mixture. Preference is given to basic polyurethane catalysts, for example, tertiary amines, such as dimethylbenzylamine, dicyclohexylmethylamine, dimethylcyclohexylamine, N,N,N',N'-tetramethyldiaminodiethylether, bis(dimethylaminopropyl) urea, N-methyl- or N-ethyl-morpholine, dimethylpiperazine, pyridine, 1,2-dimethylimidazol, 1-azobicyclo-(3,3,0)-octane, dimethylaminoethanol, 2-(N,N-dimethylaminoethoxy)ethanol, N,N',N"-tris(dialkylaminoalkyl)hexahydrotriazine and, in particular, triethylenediamine. Also suitable, however, are metallic salts, such as iron(II) chloride, zinc chloride, lead octoate, and, preferably, tin salts, such as tin dioctoate, diethyltin hexoate, and dibutyltin dilaurate, and, in particular, mixtures of tertiary amines and organic tin salts. Advantageously, from 0.1 to 10 wt %, and preferably from 0.5 to 5 wt % of catalyst based on tertiary amines and/or from 0.01 to 0.5 wt %, and preferably from 0.05 to 0.25 wt % of metallic salts, based on the weight of polyhydroxyl compounds, are used.

To the reaction mixture there may also be added auxiliaries and/or additives. Specific examples are stabilizing agents, hydrolysis protectants, pore regulators, fungistatically and bacteriostatically effective substances, dyes, pigments, fillers, surface-active substances and flameproofing agents.

Examples thereof are surface-active substances, which serve to assist homogenization of the starting materials and may also be suitable for controlling the cellular structure of the foamed plastics. Examples thereof are poly(siloxane-co-oxyalkylene)s and other organopolysiloxanes, ethoxylated alkyl phenols, ethoxylated fatty alcohols, paraffin oils, castor oil or ricinoleates, used in amounts of from 0.2 to 8, preferably from 0.5 to 5, parts by weight per 100 parts by weight of polyhydroxyl compounds.

Suitable flameproofing agent are, for example, compounds containing phosphorus and/or halogen atoms, such as tricresyl phosphate, tris-2-chloroethyl phosphate, trischloropropyl phosphate, and tris-2,3-dibromopropyl phosphate.

In addition to the aforementioned halogen-substituted phosphates, inorganic flameproofing agents, for example, antimony trioxide, arsenic oxide, ammonium phosphate, and calcium sulphate, or melamine may alternatively be used for flameproofing the cellular polyurethanes.

We have generally found it to be advantage to use from 5 to 50 parts by weight, and preferably from 5 to 25 parts by weight, of said flameproofing agents per 100 parts by weight of polyhydroxyl compound.

In order to produce the flexible polyurethane foams, the hydroxyl compounds, polyisocyanates and optionally chain-extending and/or crosslinking agents used in the invention are caused to react in the presence of catalysts, expanding agents, any auxiliaries and/or additives at temperatures ranging from 0° to 70° C., preferably from 15° to 50° C., in such proportions that, per NCO group, from 0.5 to 2 and preferably from 0.8 to 1.3 and, in particular, approximately one reactive hydrogen atom(s) is/are bound to the polyhydroxyl compound, and optionally chain extenders or cross-linking agents are present, and the molar ratio of the equivalent of water to the equivalent of NCO groups is from 0.5:1 to 5:1, preferably from 0.7:1 to 0.95:1, and more preferably from 0.75:1 to 0.85:1.

The flexible polyurethane foams produced from the block polyoxypropylene/polyoxyethylene/polyols used in the process of the invention and said ingredients possess densities of preferably from 10 to 150 $kg/m^3$ and more preferably from 20 to 70 $kg/m^3$ and are characterized by very good mechanical strength properties and good processability, which means that critical recipes do not collapse or shrink.

The invention is illustrated in detail below with reference to the following examples.

In order to produce the foams, all components except for the polyisocyanate were combined to a polyalcohol component, which was then mixed with the polyisocyanate by stirring. The reaction mixture was placed in an open mold, where it was allowed to foam freely.

In Examples 1 to 6 the foam was produced batchwise by free expansion in a Cannon Viking laboratory machine (capacity of the stirred tank: 80 L; stirring speed: 1500 $min^{-1}$).

Polyalcohols used

| Polyalcohol | 1 | 2 invention | 3 |
|---|---|---|---|
| Structure | glyc-PO-EO (14) | glyc-PO-EO (16) | glyc-PO-EO (18) |
| hydroxyl number (in mg KOH/g) | 28 | 29 | 30 |
| mol. wt. (in g/mol) | 6000 | 6000 | 6000 |
| viscosity (at 25° C. in mPa · s) | 1125 | 1166 | 993 |
| turbidity point (° C.) | 54.5 | 68 | 73 |

EXAMPLES 1 to 6

Highly resilient PU block foams (HR foams) based on TDI 80

|  | 1 | 1'(C) | 2 | 3 | 3'(C) | 4 | 5 | 6 |
|---|---|---|---|---|---|---|---|---|
| Lupranol ® 4700 | 60.00 | 60.00 | 70.00 | 5.00 | 5.00 | 70.00 | 30.00 | 20.00 |
| polyalcohol 2 | 40.00 |  | 30.00 | 95.00 |  | 30.00 | 70.00 | 80.00 |
| polyalcohol 1 |  | 40.00 |  |  | 95.00 |  |  |  |
| water | 1.10 | 1.10 | 1.10 | 4.60 | 4.60 | 2.00 | 2.50 | 3.00 |
| Tegostab ® B 8719 LF | 1.00 | 1.00 | 1.00 | 1.00 | 1.00 | 1.00 | 0.90 | 1.00 |
| Dabco ® 33 LV | 0.20 | 0.20 | 0.20 | 0.12 | 0.12 | 0.12 | 0.14 | 0.25 |
| Niax ® A1 | 0.08 | 0.08 | 0.08 | 0.04 | 0.04 | 0.08 | 0.04 | 0.08 |
| DEOA 80% | 1.00 | 1.00 | 1.00 | 1.25 | 1.25 | 1.50 | 1.25 | 1.00 |
| Kosmos ® 29 | 0.08 | 0.08 | 0.12 | 0.23 | 0.23 | 0.13 | 0.10 | 0.08 |
| Starting time [s] | 11 | 10 | 12 | 8 | 10 | 12 | 13 | 9 |
| Friability time [s] | 130 | 130 | 180 | 75 | — | 100 | 140 | 80 |
| Rising time [s] | 230 | 240 | 210 | 85 | — | 135 | 200 | 110 |
| TDI 80/index | 105 | 105 | 110 | 98 | 98 | 115 | 105 | 105 |
| Mechanical properties |  | collapse |  |  | collapse |  |  |  |
| Density [g/L] DIN 53,420 | 77.6 | — | 79 | 22 | — | 44 | 37 | 32 |
| Tensile strength [kPa] DIN 53,571 | 151 | — | 159 | 93 | — | 136 | 116 | 82 |
| Extension [%] DIN 53,571 | 118 | — | 101 | 236 | — | 80 | 163 | 137 |
| Compressive strength [kPa] (40%) DIN 53,577 | 8.2 | — | 10.7 | 1.6 | — | 9.3 | 3.4 | 2.7 |
| Indentation hardness [N] (40%) DIN 53,576 | 443 | — | 552 | 82 | — | 480 | 183 | 148 |
| Compression set [%] B (50%) DIN 53,572 | 3.8 | — | 4.4 | 12 | — | 4 | 4 | 4 |

(Amounts in parts by weight)
(C) - Comparative Example
Comment: block foams in which polyether polyol 3 was used instead of polyether polyol 1 or 2, shrank immediately after foaming, for which reason no samples could be taken.

EXAMPLES 7 to 14

Highly resilient PU block foams (HR foams) based on MDI, produced batchwise in a manual mixing test by free expansion.

|  | 7(C) | 8 | 9(C) | 10 | 11(C) | 12 | 13(C) | 14 |
|---|---|---|---|---|---|---|---|---|
| Polyalcohol ingredients |  |  |  |  |  |  |  |  |
| polyalcohol 1 | 96.000 |  | 100.00 |  | 96.000 |  | 100.00 |  |
| polyalcohol 2 |  | 96.000 |  | 100.00 |  | 96.000 |  | 100.00 |
| Lupranol ® 2047 | 4.000 | 4.000 |  |  | 4.000 | 4.000 |  |  |
| water | 2.540 | 2.540 | 2.750 | 2.750 | 2.540 | 2.540 | 2.750 | 2.750 |
| Niax ® A1 | 0.400 | 0.400 | 0.400 | 0.400 | 0.400 | 0.400 | 0.400 | 0.400 |
| DEOA 100% | 0.248 | 0.248 | 0.400 | 0.400 | 0.248 | 0.248 | 0.400 | 0.400 |
| DBTL | 0.050 | 0.050 | 0.080 | 0.080 | 0.050 | 0.050 | 0.080 | 0.080 |
| B 8719 | 0.100 | 0.100 | 0.100 | 0.100 | 0.100 | 0.100 | 0.100 | 0.100 |
| Lupranat ® VP 9288 | 52.6 | 52.6 | 55.1 | 55.1 | 52.6 | 52.6 | 55.1 | 55.1 |
| Index | 96.0 | 96.0 | 93.3 | 93.3 | 96.0 | 96.0 | 93.3 | 93.3 |
| Starting time [s] | 20 | 25 | 20 | 25 | 20 | 20 | 20 | 25 |
| Friability time [s] | 100 | 95 | 95 | 90 | 90 | 95 | 90 | 90 |
| Rising time [s] | 125 | 130 | 125 | 140 | 120 | 125 | 120 | 140 |
| Mechanical properties |  |  |  |  |  |  |  |  |
| Bulk density [g/L] DIN 53,420 | 54.9 | 53.2 | 55.3 | 50.1 | 50.1 | 48 | 50.1 | 48.3 |
| Tensile strength [N/mm$^2$] DIN 53,571 | 62 | 80 | 85 | 67.8 | 67.8 | 83 | 67.8 | 75 |
| Extension [%] DIN 53,571 | 97 | 104 | 114 | 113 | 113 | 110 | 113 | 110 |
| Compressive strength 40% [kPa] DIN 53,577 | 4.6 | 4 | 5.5 | 3.5 | 3.5 | 3.1 | 3.5 | 3.2 |

-continued

|  | 7(C) | 8 | 9(C) | 10 | 11(C) | 12 | 13(C) | 14 |
|---|---|---|---|---|---|---|---|---|
| Compression set [%] 22 h/70° C./50% DIN 53,572 | 2.6 | 2.9 | 2.4 | 3.3 | 3.3 | 3.3 | 3.3 | 3.3 |
| Impact resilience [%] DIN 53,573 | 60 | 63 | 57 | 59 | 59 | 59 | 59 | 60 |
| Indentation hardness B DIN 53,576 | | | | | | | | |
| 25% [N] | 171 | 128 | 190 | 94 | 94 | 90 | 94 | 84 |
| 40% [N] | 238 | 178 | 261 | 142 | 142 | 128 | 142 | 138 |
| 65% [N] | 460 | 342 | 517 | 286 | 286 | 266 | 286 | 279 |

(Amounts in parts by weight)

Foamed plastics produced as in Example 8 but using 4 parts by weight of polyalcohol 3 instead of polyalcohol 2, were not dimensionally stable and shrank immediately after curing. No mechanical properties could be determined.

EXAMPLES 15 to 18

Foamed plastics produced in Example 16 but using 55 parts by weight of polyalcohol 3 instead of polyalcohol 2 were not dimensionally stable and shrank immediately after curing.

The foamed plastics produced by the process of the invention are distinguished by improved tensile strength and elasticity, and, in addition, the same formulation can give a lower bulk density.

|  | viscoelastic 15(C) | viscoelastic 16 | resilient 17(C) | resilient 18 |
|---|---|---|---|---|
| polyalcohol 1 | 55.000 |  | 55.000 |  |
| polyalcohol 2 |  | 55.000 |  | 55.000 |
| Lupranol ® 2043 | 9.000 | 9.000 | 27.900 | 27.900 |
| Pluriol ® E 400 | 10.000 | 10.000 | 5.000 | 5.000 |
| glycerol | 2.000 | 2.000 | 2.000 | 2.000 |
| Lumitol ® H 136 | 20.000 | 20.000 | 1.000 | 1.000 |
| 1,4-butanediol |  |  | 1.000 | 1.000 |
| water | 3.500 | 3.500 | 3.800 | 3.800 |
| DBTL | 0.350 | 0.350 | 0.300 | 0.300 |
| Basonat ® PLR 8926 | 99.9 | 99.9 | 101.6 | 101.6 |
| Index | 80.0 | 80.0 | 85.6 | 85.6 |
| Starting time [s] | 32 | 28 | 40 | 38 |
| Friability time [s] | 137 | 122 | 215 | 240 |
| Rising time [s] | 200 | 172 | 265 | 350 |
| Bulk density [kg/m$^3$] DIN 53,420 | 63.1 | 65.2 | 54.8 | 59.4 |
| Tensile strength [N/mm$^2$] DIN 53,571 | 23 | 24 | 52 | 62 |
| Extension [%] DIN 53,571 | 122 | 115 | 82 | 90 |
| Tear propagation resistance (Graves) [N/mm] | 0.12 | 0.13 | 0.24 | 0.25 |
| Compressive strength 40% [kPa] DIN 53,577 | 1.2 | 1.4 | 2.6 | 3.2 |
| Compression set 22 h/70° C./50% [%] DIN 53,572 | 1.1 | 0.1 | 0.3 | 0.1 |
| Impact resilience [%] DIN 53,573 | 9 | 8 | 26 | 26 |
| Indentation hardness B DIN 53,576 | | | | |
| Indentation hardness 25% [N] | 39 | 44 | 85 | 95 |
| Indentation hardness 40% [N] | 57 | 64 | 135 | 151 |
| Indentation hardness 65% [N] | 126 | 136 | 329 | 356 |

1) The Lumitol was freed from solvent before use.
(Amounts in parts by weight)

| Feedstock: | |
|---|---|
| Lupranol ® 4700 | graft polyether polyol, base on acrylnitrile/styrene, hydroxyl value 29 mg KOH/g, solids content: 40%, viscosity 5000 mPa · s (25° C.) |
| Lupranol ® 2047 | polyoxypropylene-polyoxyethylene triol, hydroxyl value 42 KOH/g |
| DBTL: | dibutyltin dilaurate |
| DEOA: | diethanolamine 80% strength in water |
| Niax ® A1 | bis(N,N-dimethylaminoethyl) ether, 70% strength in dipropylene glycol |
| DABCO ® 33 LV | diazabicyclooctane, 33% strength in dipropylene glycol |
| Tegostab ® B8719 LF: | silicon stabiliser, sold by Goldschmidt |
| Kosmos ® 29: | tin octoate; catalyst, Goldschmidt |
| Lupranat VP 9288 | modified MDI, sold by BASF AG, NCO content: 28.3%, viscosity (25° C.): 70 mPa · s |
| Basonat ® P LR 8926: | polyisocyanate of HDI, NCO content 19.0 wt % |
| Pluriol ® E 400: | polyoxyethylene diol, hydroxyl value 280 mg KOH/g |
| Lumitol ® H 136: | acrylate resin, solids content 70%, hydroxyl value 135 mg KOH/g |
| polyalcohols 1 to 3 | produced by adding propylene oxide and then an ethylene oxide end block of the stated length to glycerol, which addition was carried out using KOH. |

What is claimed is:

1. A process for the production of flexible polyurethane foams comprising the reaction product of
    a) at least one compound having at least two isocyanate-reactive hydrogen atoms, with
    b) polyisocyanates,
wherein the compound used as said compound a) having at least two isocyanate-reactive hydrogen atoms comprises at least one block polyoxypropylene/polyoxyethylene/polyol having a hydroxyl value of from 25 to 45 mg KOH/g and a content of terminally bound ethylene oxide units of from 15 to 17 wt %, based on the total amount of alkylene oxide, obtained by attachment of ethylene oxide and propylene oxide to an initiator having an average functionality of 3.

2. A process as defined in claim 1, wherein the block polyoxypropylene/polyoxyethylene/polyol exhibits a hydroxyl value of from 25 to 35 mg KOH/g.

3. A process as defined in claim 1, wherein the block polyoxypropylene/polyoxyethylene/polyol is used in admixture with other polyalcohols.

4. A process as defined in claim 1, wherein the block polyoxypropylene/polyoxyethylene/polyol is used in admixture with graft polyalcohols.

5. A process as defined in claim 1, wherein the flexible polyurethane foams are produced by a mold-foaming process.

6. A process as defined in claim 1, wherein the flexible polyurethane foams are produced by block foaming.

7. A flexible polyurethane foam comprising the reaction product of
    a) at least one compound having at least two isocyanate-reactive hydrogen atoms and containing at least one block polyoxypropylene/polyoxyethylene/polyol having a hydroxyl value of from 25 to 45 mg KOH/g and a content of terminally bound ethylene oxide units of from 15 to 17 wt %, based on the total amount of alkylene oxide, obtained by attachment of ethylene oxide and propylene oxide to an initiator having an average functionality of 3, with
    b) polyisocyanates.

8. A block polyoxypropylene/polyoxyethylene/polyol having a hydroxyl value of from 25 to 45 mg KOH/g and a content of terminally bound ethylene oxide units of from 15 to 17 wt %, based on the total amount of alkylene oxide, obtained by attachment of ethylene oxide and propylene oxide to an initiator having an average functionality of 3.

9. A polyol mixture for the production of flexible polyurethane foams, containing at least one block polyoxypropylene/polyoxyethylene/polyol having a hydroxyl value ranging from 25 to 45 mg KOH/g and a content of ethylene oxide from 15 to 17 wt % based on the total amount of the alkylene oxide added, which polyol is attached to the end of the polyether chain.

10. A polyol mixture as defined in claim 8, comprising at least one block polyoxypropylene/polyoxyethylene/polyol having a content of ethylene oxide from 15 to 17 wt % based on the total amount of the alkylene oxide added, which polyol is attached to the end of the polyether chain, and at least one graft polyalcohol.

11. A polyol mixture as defined in claim 8, comprising at least one block polyoxypropylene/polyoxyethylene/polyol having a hydroxyl value ranging from 25 to 45 mg KOH/g and a content of ethylene oxide from 15 to 17 wt % based on the total amount of the alkylene oxide added, which polyol is attached to the end of the polyether chain, and at least one graft polyalcohol having a hydroxyl value ranging from 20 to 40 mg KOH/g.

12. A polyol mixture as defined in claim 8, comprising at least one block polyoxypropylene/polyoxyethylene/polyol having a hydroxyl value ranging from 35 to 45 mg KOH/g and a content of ethylene oxide from 15 to 17 wt % based on the total amount of the alkylene oxide added, which polyol is attached to the end of the polyether chain, and at least one graft polyalcohol having a hydroxyl value ranging from 20 to 40 mg KOH/g, the content of graft polyalcohol(s) being in the range of from 5 to 95 mg KOH/g, based on the polyol mixture.

13. A polyol mixture as defined in claim 8, comprising at least one block polyoxypropylene/polyoxyethylene/polyol having a hydroxyl value ranging from 35 to 45 mg KOH/g and a content of ethylene oxide from 15 to 17 wt % based on the total amount the added alkylene oxide, which polyol is attached to the end of the polyether, and at least one graft polyalcohol having a hydroxyl value ranging from 20 to 40 mg KOH/g, the content of graft polyalcohol(s) being in the range of from 27 to 75 wt %, based on the polyol mixture.

* * * * *